US009017110B2

(12) United States Patent
Guillanton et al.

(10) Patent No.: US 9,017,110 B2
(45) Date of Patent: Apr. 28, 2015

(54) CABLE JUNCTION

(75) Inventors: Erwan Guillanton, Maintenon (FR); Gilles Schmitt, Senantes (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 63 days.

(21) Appl. No.: 13/518,586

(22) PCT Filed: Dec. 21, 2010

(86) PCT No.: PCT/EP2010/070444
§ 371 (c)(1),
(2), (4) Date: Nov. 7, 2012

(87) PCT Pub. No.: WO2011/076819
PCT Pub. Date: Jun. 30, 2011

(65) Prior Publication Data
US 2013/0056256 A1   Mar. 7, 2013

(30) Foreign Application Priority Data

Dec. 24, 2009   (WO) .................. PCT/IB2009/056060

(51) Int. Cl.
| | | |
|---|---|---|
| H01R 9/00 | (2006.01) | |
| H02G 3/06 | (2006.01) | |
| H01R 9/05 | (2006.01) | |
| H01R 13/6592 | (2011.01) | |
| H02G 3/04 | (2006.01) | |

(52) U.S. Cl.
CPC ........... *H02G 3/0666* (2013.01); *H01R 9/0503* (2013.01); *H01R 9/0524* (2013.01); *H01R 13/6592* (2013.01); *H02G 3/0462* (2013.01)

(58) Field of Classification Search
USPC ...... 174/34, 35 R, 66, 67, 74 R, 78, 75 C, 93, 174/351; 206/305, 307, 308.1–308.3, 320, 206/701; 220/241, 242; D8/353; 439/136, 439/143–147, 718, 730
See application file for complete search history.

(56) References Cited

U.S. PATENT DOCUMENTS

| | | | | | |
|---|---|---|---|---|---|
| 2,024,862 | A | * | 12/1935 | Hooley | 174/100 |
| 2,636,065 | A | * | 4/1953 | Fiske | 439/892 |
| 2,798,113 | A | * | 7/1957 | Koller et al. | 174/75 C |
| 3,175,032 | A | * | 3/1965 | Strauss | 174/93 |
| 3,598,895 | A | * | 8/1971 | Garland | 174/5 R |
| 3,744,128 | A | * | 7/1973 | Fisher et al. | 29/858 |
| 3,990,765 | A | * | 11/1976 | Hill | 439/607.51 |
| 4,086,427 | A | * | 4/1978 | Nasuta et al. | 174/88 C |
| 4,232,184 | A | * | 11/1980 | Faust | 174/92 |
| 4,433,206 | A | * | 2/1984 | Lewis | 174/359 |
| 4,438,294 | A | * | 3/1984 | Meltsch et al. | 174/88 R |

(Continued)

FOREIGN PATENT DOCUMENTS

FR   2 694 990   2/1994

*Primary Examiner* — Jenny L Wagner
*Assistant Examiner* — Michael E Moats, Jr.
(74) *Attorney, Agent, or Firm* — Robert J Myers (57) ABSTRACT

The cable junction includes at least two electrical cables extending side by side, each including its own independent shield and a front end section where its independent shield is stripped off, a common shield surrounding the front end sections and the independent shields of the cables, and a clamping device for clamping the common shield on the independent shields. The clamping device includes internal clamping means for clamping the common shield on flanks of the independent shield sheaths.

15 Claims, 7 Drawing Sheets

(56) References Cited

U.S. PATENT DOCUMENTS

| | | | |
|---|---|---|---|
| 4,447,100 A * | 5/1984 | Dyce et al. | 439/95 |
| 4,527,028 A * | 7/1985 | Luehring | 218/119 |
| 4,614,398 A * | 9/1986 | Wright et al. | 439/579 |
| 4,678,865 A * | 7/1987 | Sherwin | 174/36 |
| 4,781,602 A * | 11/1988 | Cobaugh | 439/82 |
| 4,896,000 A * | 1/1990 | Procter et al. | 174/74 R |
| 5,266,744 A * | 11/1993 | Fitzmaurice | 174/103 |
| 5,817,978 A * | 10/1998 | Hermant et al. | 174/75 C |
| 5,824,956 A * | 10/1998 | Garban et al. | 174/93 |
| 5,850,056 A * | 12/1998 | Harwath | 174/40 CC |
| 5,952,613 A * | 9/1999 | Miettinen | 174/74 R |
| 6,095,829 A * | 8/2000 | Burland | 439/98 |
| 6,227,881 B1 * | 5/2001 | Tharp et al. | 439/98 |
| 6,246,000 B1 * | 6/2001 | Wehrmann et al. | 174/74 R |
| 6,339,193 B1 * | 1/2002 | Goett et al. | 174/78 |
| 6,583,352 B2 * | 6/2003 | Fukushima et al. | 174/373 |
| 6,878,882 B2 * | 4/2005 | Larkin | 174/135 |
| 7,094,970 B2 * | 8/2006 | Kihira | 174/74 R |
| 7,232,954 B2 * | 6/2007 | Ikeda | 174/74 R |
| 7,247,795 B2 * | 7/2007 | Sumi et al. | 174/74 R |
| 7,275,960 B2 * | 10/2007 | Fukushima et al. | 439/607.15 |
| 8,460,015 B2 * | 6/2013 | Deno et al. | 439/98 |
| 2003/0221850 A1 * | 12/2003 | Mizutani | 174/36 |
| 2004/0099428 A1 * | 5/2004 | Miyazaki | 174/35 C |
| 2005/0039941 A1 * | 2/2005 | Marroquin et al. | 174/78 |
| 2007/0251724 A1 * | 11/2007 | Kuo | 174/74 R |
| 2009/0250235 A1 * | 10/2009 | Gladd et al. | 174/34 |
| 2010/0000788 A1 * | 1/2010 | Kawase et al. | 174/74 R |
| 2011/0155458 A1 * | 6/2011 | Kato et al. | 174/74 R |

* cited by examiner

CABLE JUNCTION

The present invention relates to shielding of electrical cables, in particular those used in motor vehicles.

An electrical cable contains one or more wires made of electrically conductive material such as copper hold together inside a jacket which is usually insulating. When there are several wires within one cable, each of the wires is wrapped in its own respective insulating sheath.

Shielding consists in preventing electromagnetic fields to interfere with a wire. To this end the wire is separated from its environment, usually with the help of an electrically conductive barrier. Shielding of a cable can be obtained by providing a conductive wrap around the wire or bundle of wires of the cable.

Some electrical connectors are intended to receive two or more electrical cables, and are provided with a common shield surrounding end portions of the received cables. On the other hand, it may happen that each of the cables is provided with its own independent shielding braid, so that there is a need for a cable junction which provides for the electrical and shielding continuity from the independent shielding braid of each cable to the single common shielding of the connector, this cable junction together with the independent shielding braid forming a shielding assembly.

Further in case some openings in the shielding assembly can not be avoided, it is advantageous to have them as small as possible, the maximum frequency and level of the electromagnetic disturbances which can go through the shielding depending on the size of those tolerated openings.

Document U.S. Pat. No. 5,091,604 describes a cable junction comprising a first and a second electrical cables which merge into a third cable, each cable comprising its own independent shield sheath, which shield sheaths are interrupted at the beginning of a front end portion of the corresponding cable, which shielding braid are not directly connected to one another, and a junction housing provided with three branches surrounding the front end portions of the three cables and connecting together the shielding braid of the three cables.

The use of a junction housing is costly and troublesome. In particular the junction housing is difficult to manufacture because of its shape, especially when the junction housing is constructed in a single piece. Further a junction housing require much space around the cable.

An aim of the invention is to provide such a cable junction which does not require a junction housing.

Another aim of the invention is to provide a shielded cable junction with small electromagnetic leak.

Another aim of the invention is to provide a shielded cable junction which is easy to implement and cheap.

Another aim of the invention is to provide a shielded cable junction which has a small space requirement.

Accordingly, it is proposed a cable junction as claimed in the appended claims.

Preferred embodiments of the invention will now be described in reference to the accompanying drawings in which.

In the following description, like parts will be designated by like numbers. The elements illustrated on the figures will be orientated for clarity according to a rear-front axis XX'.

Figure 1:
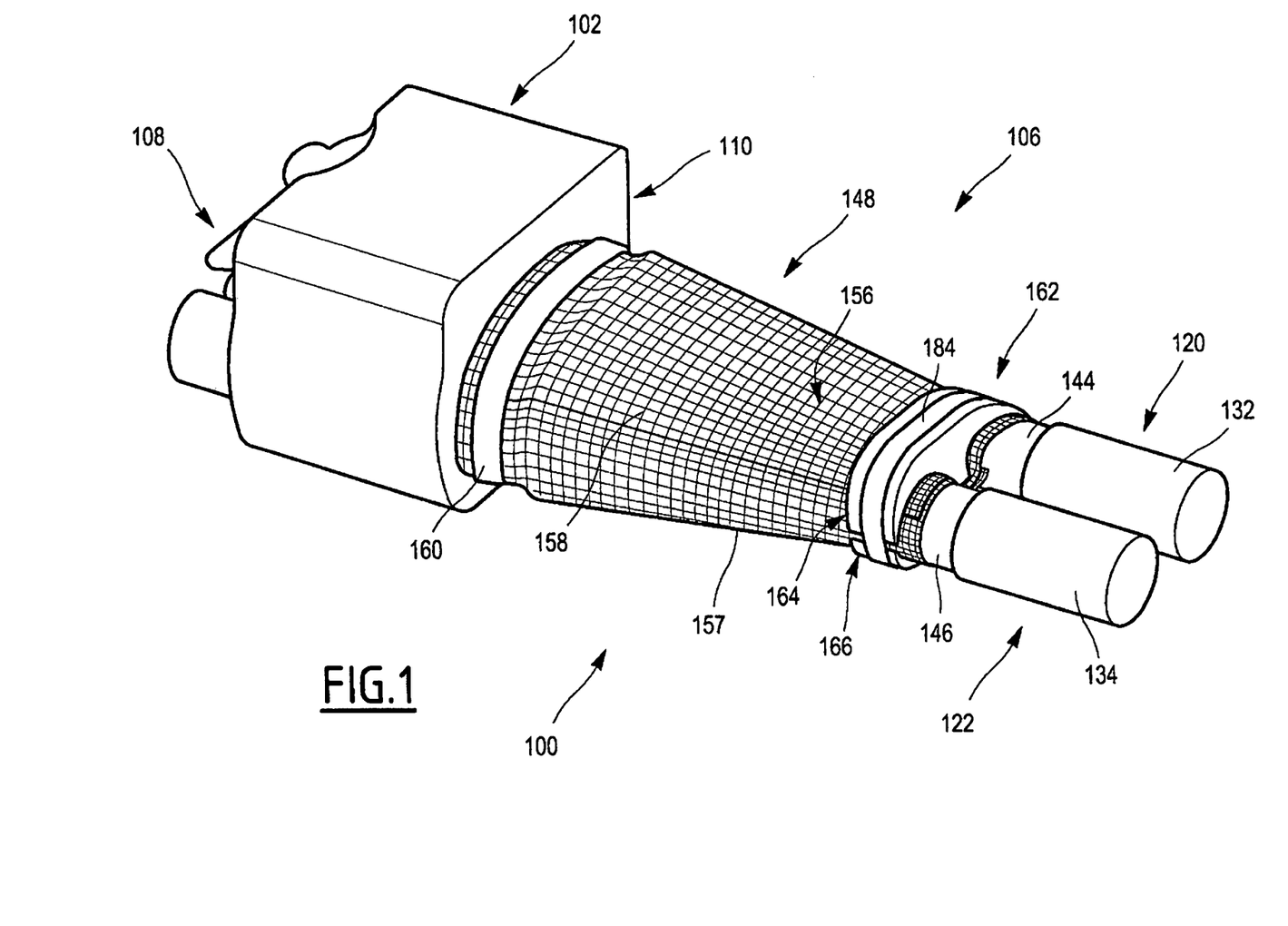
FIG. 1 is a three-dimensional view of an electrical system comprising a cable junction according to a first embodiment of the invention.
Figure 2:
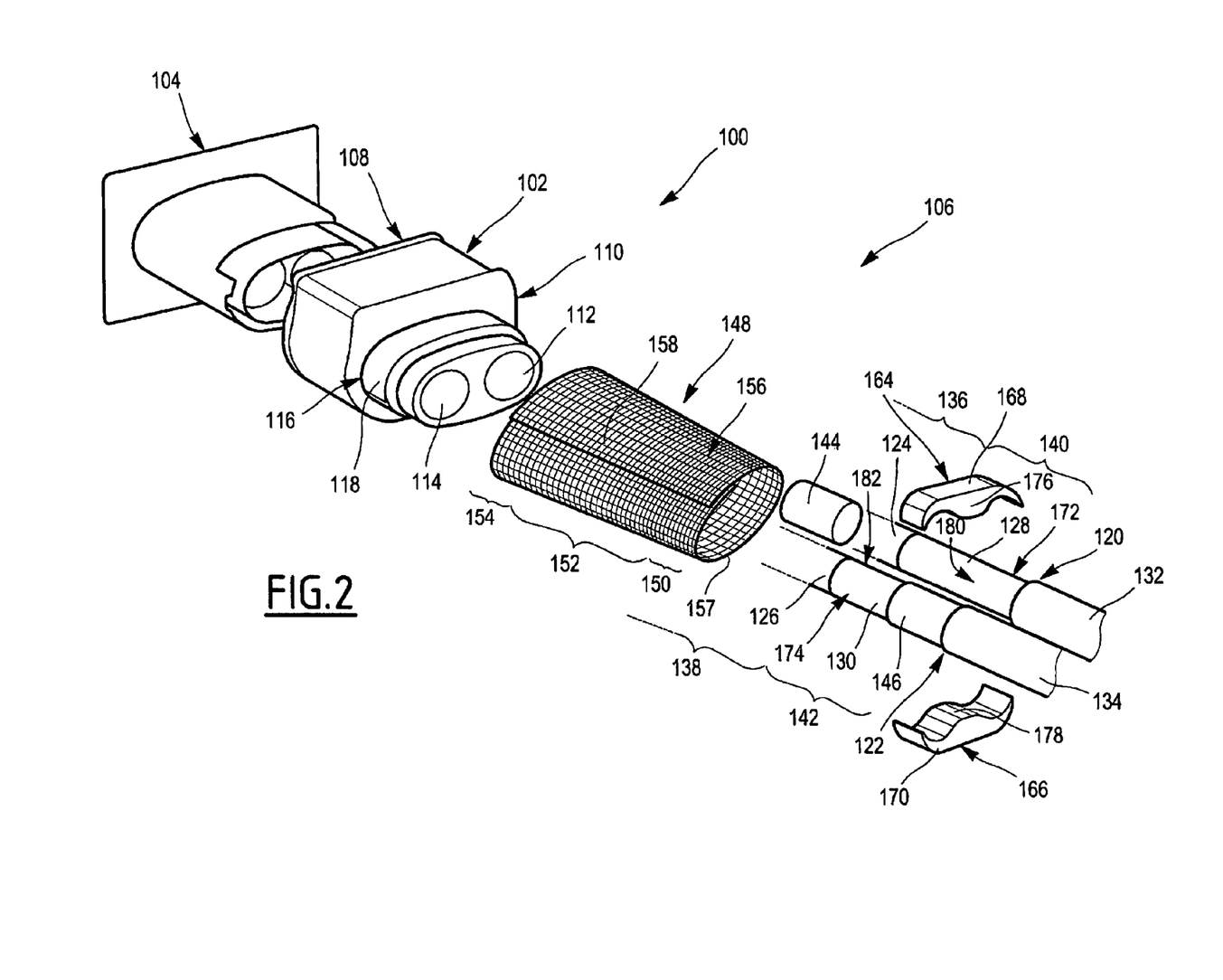
FIG. 2 is an exploded view of the electrical system of FIG. 1.

Referring to FIGS. 1 and 2, an electrical system 100 comprises an electrical component, in the shown embodiment a connector 102 with a counterpart electrical connector 104 and a cable junction 106 according to a first embodiment of the invention.

The electrical connector 102 comprises a front mating face 108 for mating with the counterpart electrical connector 104, and a rear cable receiving face 110.

The electrical connector 102 comprises cable reception cavities 112, 114 opening through the rear face 110.

The electrical connector 102 comprises a connector shield 116 wrapped around all the cavities 112, 114. The connector shield 116 is tubular and comprises a rear projection 118 from the rear face 110.

The cable junction 106 comprises two electrical cables 120, 122 extending side by side. In the illustrated example, the cables 120, 122 are parallel to each other, but they also could make an angle with respect to each other. Each cable 120, 122 comprises a single wire 124, 126 (although it could comprise more wires), its own independent shielding means and an outer insulating sheath 132, 134. The shielding means comprises a shielding braid 128, 130 surrounding the wire 124, 126. Each cable 120, 122 comprises a front end section 136, 138 where the insulating sheath 132, 134 and the independent shield braid 128, 130 is stripped off, so that the wires 126, 124 are apparent. The front end sections 136, 138 are received in the cavities 112, 114 of the electrical connector 102.

Each cable 120, 122 comprises, rearward and adjacent to the front end section, a shield apparent section 140, 142 where the insulating sheath 132, 134 is stripped off, so that the independent shield braid 128, 130 is apparent. The shield apparent section is located at a distance rearward from the electrical connector 102.

The shielding means comprises advantageously, for each cable 120, 122, a respective electrically conductive sleeve 144, 146, mounted on the shielding braid at the level of the apparent sections 140, 142.

The cable junction 106 comprises a flexible common shield 148 for ensuring shielding continuity between the independent shielding means of the cables 120, 122 and the connector shield 116. The common shield 148 comprises a rear section 150 surrounding and urged in tight contact with the independent shielding braid of the cables. More precisely, the rear section 150 is located on the shield apparent sections 140, 142 of the cables 120, 122. The common shield 148 comprises a central section 152 surrounding the front end sections 138 of the cables 132, 134. The common shield 148 comprises a front section 154 surrounding the rear projection 118 of the connector shield 116.

The common shield 148 comprises a tubular conductive braid 156, made of a braid sheet 157, folded on itself with a lateral overlapping 158.

The cable junction 106 comprises a front collar 160 for clamping the front section 154 of the common shield 150 on the rear projection 118 of the connector shield 116.

The cable junction 106 comprises a clamping device 162 for clamping the common shield 148 on the independent shielding means.

In the described examples, the common shield 148 is clamped on the independent shielding braid 128, 130 via the conductive sleeves 144, 146, so that the electrically conductive sleeves 144, 146 protect the independent shielding braid 128, 130 and the wires 124, 126 from being deteriorated by the clamping. In other embodiments, the conductive sleeves could be omitted, and the common shield clamped directly on the independent shielding braid 128, 130.

The clamping device 162 comprises two half clamps 164, 166 for transversally clamping the common shield 150 on the conductive sleeves 144, 146.

Each half clamp 164, 166 comprises an half bush 168, 170 extending from an external flank 172 of the independent shielding braid 128 of one cable 120 to an external flank 174 of the independent shielding braid 130 of the other cable 122. The external flanks 172, 174 are the flanks which do not face a flank of another cable. The half bushes 168, 170 are an example of external clamping means for clamping the common shield 148 on the external flanks 172, 174 of the independent shielding braids, via the conductive sleeves 144, 146.

Each half clamp 164, 166 comprises, fixed to the respective half bush 168, 170, a wedge 176, 178 introduced transversally between internal flanks 180, 182 of the independent shielding braids 128, 130 of the cables 132, 134. The internal flanks 180, 182 are flanks facing each other. The wedges 176, 178 point toward each other and are an example of internal clamping means for clamping the common shield on flanks of the independent shielding braids, called internal flanks, facing each other.

The clamping device 162 comprises a rear collar 184 for bringing the half clamps 164, 166 closer to each other transversally, so as to achieve clamping.

Figure 3:
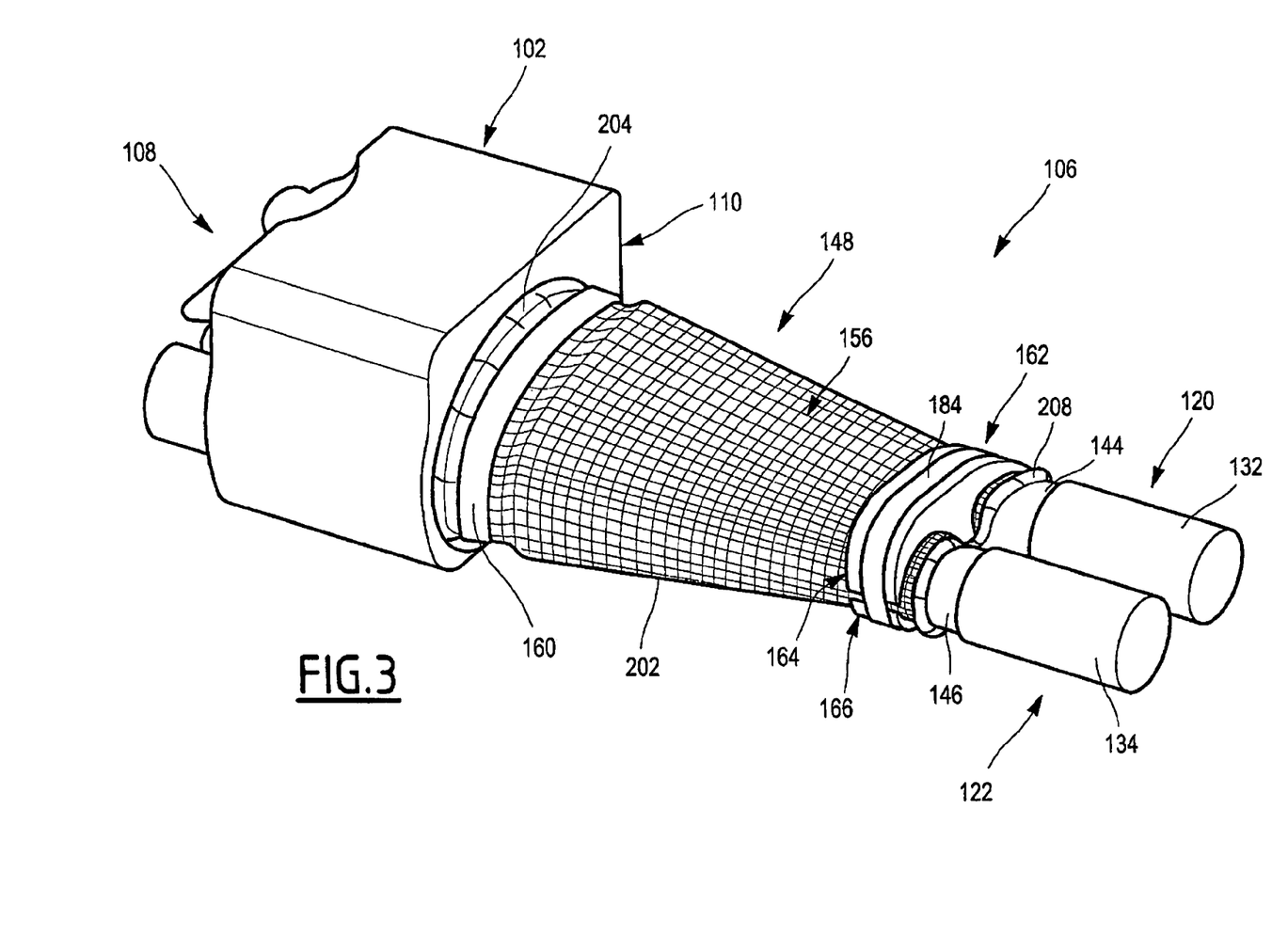
FIG. 3 is a three-dimensional view of an electrical system comprising a cable junction according to a second embodiment of the invention.
Figure 4:
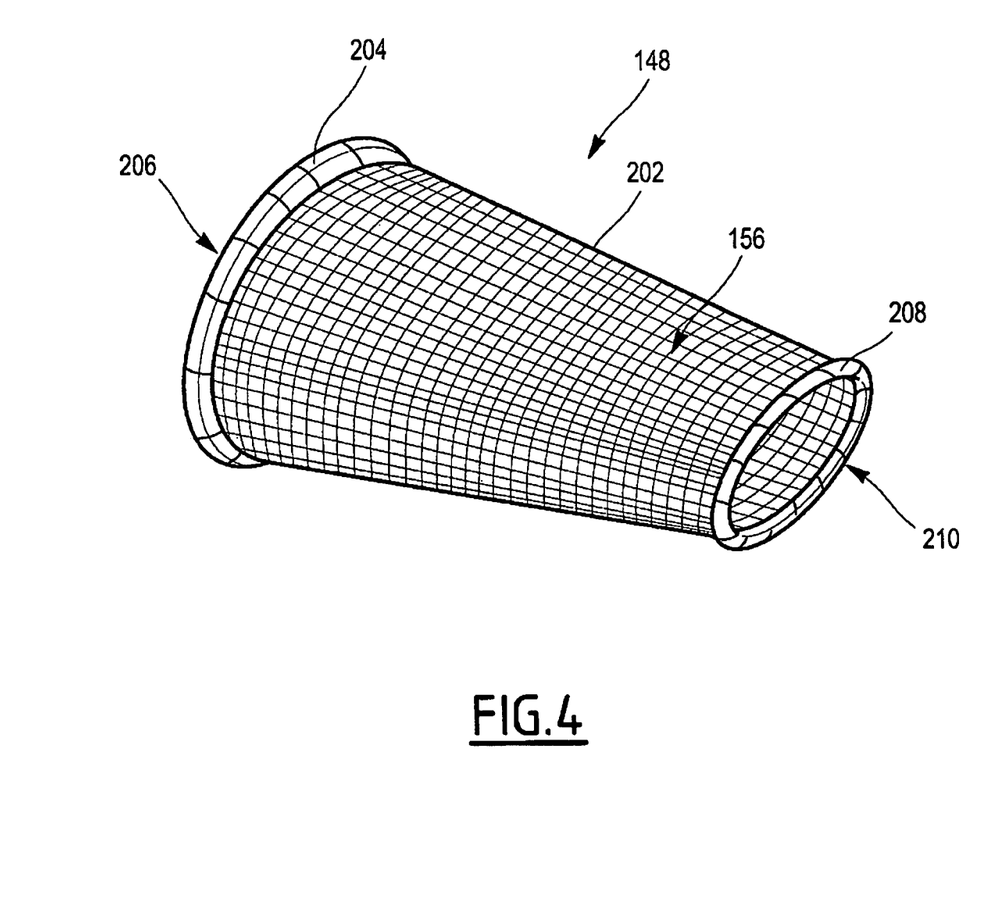
FIG. 4 is a three dimensional view of a part of the cable junction of FIG. 3.

Referring to FIGS. 3 and 4, in another embodiment, the tubular braid 156 is not made of a folded sheet, but rather is made of a continuous braid cylinder 202.

The cable junction 106 comprises an insulating front ring 204 fixed at a front end 206 of the braid 156, and an insulating rear ring 208 fixed at a rear end 210 of the braid 156. The rings 204, 208 are preferably moulded on the braid 156. The rings 204, 208 prevent the braid 156 from fraying.

Moreover, the rings 204, 208 are provided with a small circumference so that they need to be stretched in order to be mounted on the connector shield 116 and the cables 120, 122 respectively. The stretching aims at maintaining the common shield 148 stable while being clamped.

Preferably, the front ring 204 is provided with a positioning notch or a rib, while the electrical connector is provided with a positioning, respectively, rib or notch, so as to ensure the angular positioning of the common shield 148 with respect to the electrical connector 102.

Figure 5:
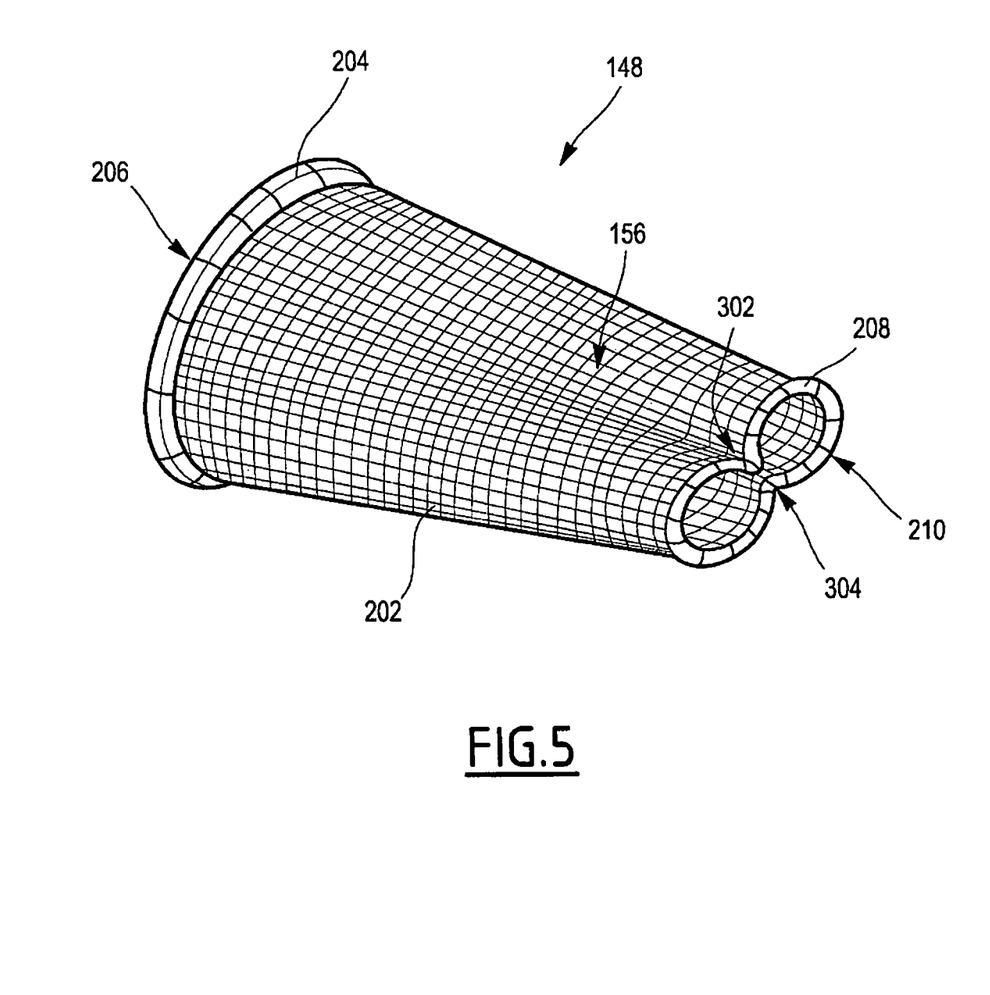
FIG. 5 is a three dimensional view of a part of a cable junction according to a third embodiment of the invention.

Referring to FIG. 5, in another embodiment, the rear ring is provided with, at rest, a shape comprising two opposite bulges 302, 304 intended to be introduced between the internal flanks 180, 182 of the independent shielding braids 128, 130.

Figure 6:
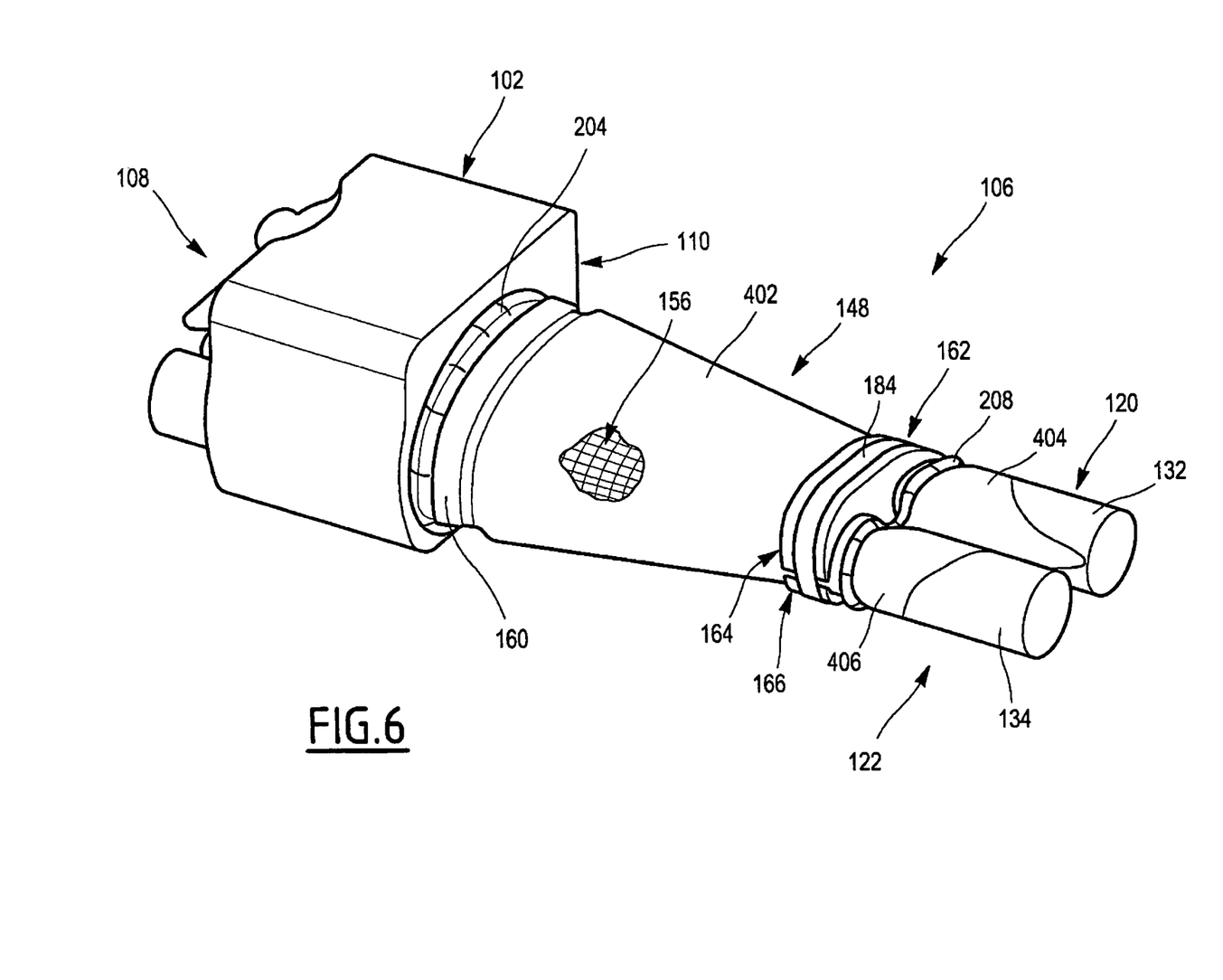
FIG. 6 is a three dimensional view of an electrical system comprising a cable junction according to a fourth embodiment of the invention.
Figure 7:
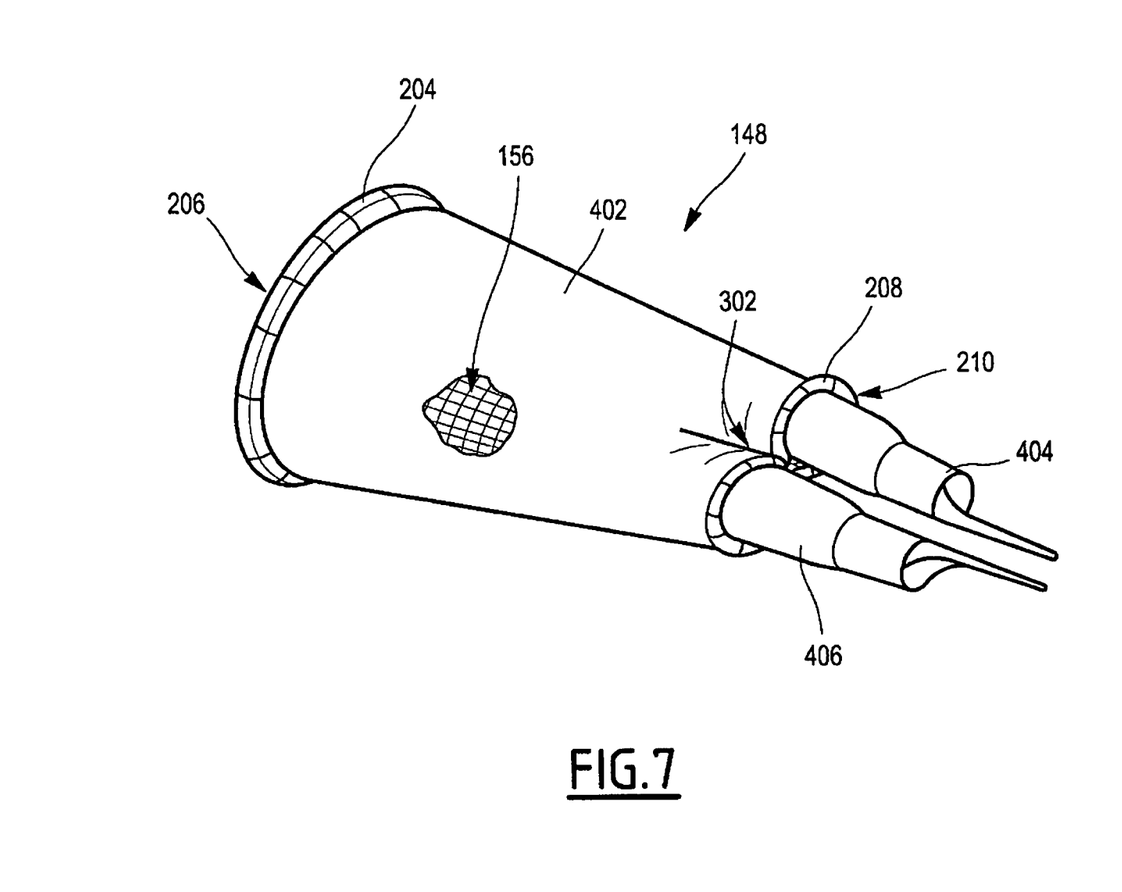
FIG. 7 is a three dimensional view of a part of the cable junction of FIG. 6.

Referring to FIGS. 6 and 7, in another embodiment, the cable junction 106 is identical to that one illustrated on FIG. 3, except that the common shield further comprises an insulating sheath 402 covering the braid 156. Moreover, the cable junction 106 comprises, for each cable 120, 122, an insulating tubular finger 404, 406 projecting rearward from the rear end of the common shield and stretched around its respective cable 120, 122, so as to grip the cable 120, 122, preventing unwanted removal.

What is claimed is:
1. A cable junction comprising:
a first electrical cable having a first wire and a first shielding means;
a second electrical cable having a second wire and a second shielding means;
an electrical connector defining a first cavity in which the first wire is received and a second cavity in which the second wire is received;
a single tubular conductive braid surrounding portions of both the first shielding means and the second shielding means and providing a flexible common shield;
a clamping device electrically connecting the tubular conductive braid to a portion of the first shielding means and a portion of the second shielding means, said clamping device surroundingly clamping the tubular conductive braid directly to internal and external flanks of the first and second shielding means; and
an electrical connector shield distinct from the tubular conductive braid and wrapped about the first and second cavity of the electrical connector, said electrical connector shield electrically connected to the tubular conductive braid.

2. The cable junction according to claim 1, wherein the first shielding means and the second shielding means each comprise a shielding braid.

3. The cable junction according to claim 2, wherein the first shielding means and the second shielding means each further comprises an electrically conductive sleeve surrounding the shielding braid.

4. The cable junction according to claim 1, wherein the clamping device comprises a first wedge clamping a portion of the tubular conductive braid to internal flanks of the first and second shielding means.

5. The cable junction according to claim 4, wherein the clamping device comprises a second wedge introduced between the internal flanks of the first and second shielding means and wherein the first and second wedges point toward each other.

6. The cable junction according to claim 1, wherein the tubular conductive braid is made of a braided sheet that is folded onto itself with a lateral overlap.

7. The cable junction according to claim 1, wherein the tubular conductive braid is made of a continuous braided cylinder.

8. The cable junction according to claim 1, further comprising two insulating rings fixed at respective ends of the tubular conductive braid.

9. The cable junction according to claim 8, wherein the insulating ring at an end of the tubular conductive braid is provided with, at rest, two opposite bulges configured to be introduced between the internal flanks of the independent shields.

10. The cable junction according to claim 1, further comprising an insulating sheath covering the tubular conductive braid.

11. The cable junction according to claim 1, further comprising, for each cable, an insulating tubular finger projecting rearward from the rear end of the tubular conductive braid and stretched around the respective cable.

12. The cable junction according to claim 1, wherein the clamping device is arranged transversely to the first and second electrical cable.

13. The cable junction according to claim 12, wherein the clamping device comprises a half clamp defining a first semi-cylindrical opening clamping the tubular conductive braid to internal and external flanks of the first shielding means and a second semi-cylindrical opening clamping the tubular conductive braid to internal and external flanks of the second shielding means.

14. The cable junction according to claim 13, wherein the clamping device comprises two half clamps, wherein the first semi-cylindrical openings surroundingly clamp the tubular conductive braid to the internal and external flanks of the first shielding means and wherein the second semi-cylindrical openings surroundingly clamp the tubular conductive braid to the internal and external flanks of the second shielding means.

15. The cable junction according to claim 14, wherein the clamping device further comprises an external clamping means surroundingly clamping the two half clamps to the tubular conductive braid.

* * * * *